Aug. 25, 1936. W. J. WHITE Re. 20,081

FILE

Original Filed Nov. 5, 1932 3 Sheets-Sheet 1

Witnesses:
C. E. Wessels
Anita E. Matson

Inventor:
William J. White,
By Joshua R. H. Potts
his Attorney.

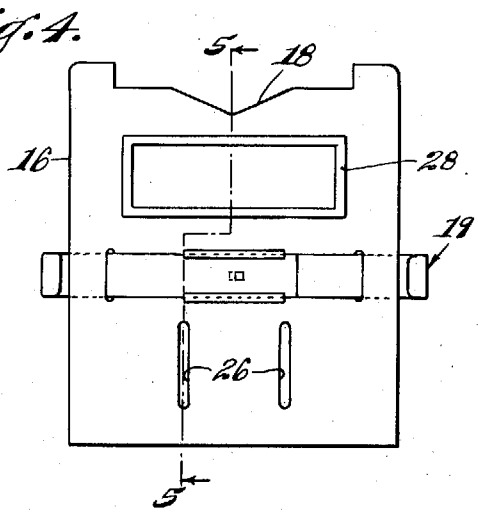
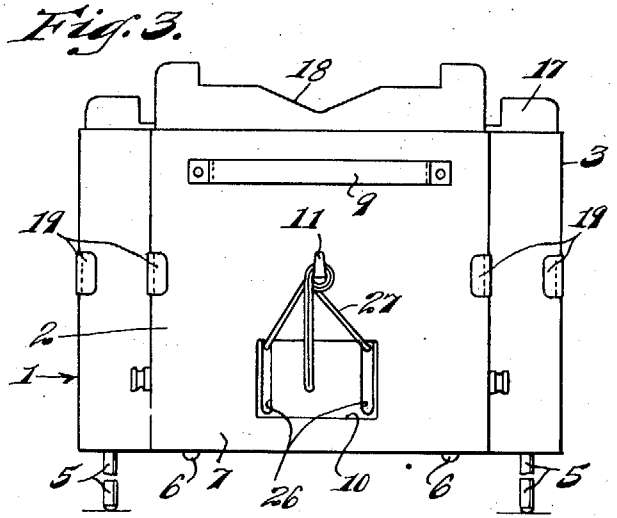
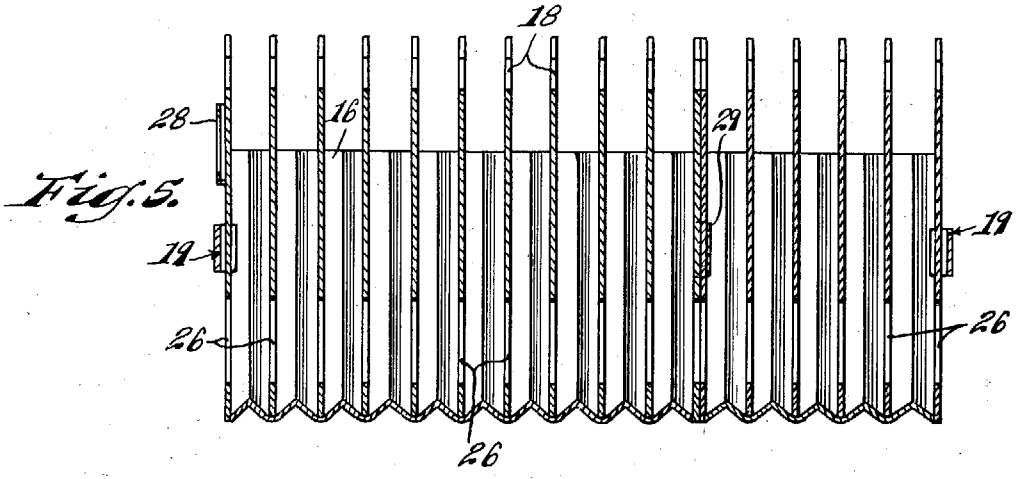
Witnesses:
C. E. Wessels
Anita E. Matteu
Inventor:
William J. White,
By Joshua R. H. Ross
his Attorney.

FILE
Original Filed Nov. 5, 1932 3 Sheets-Sheet 3.
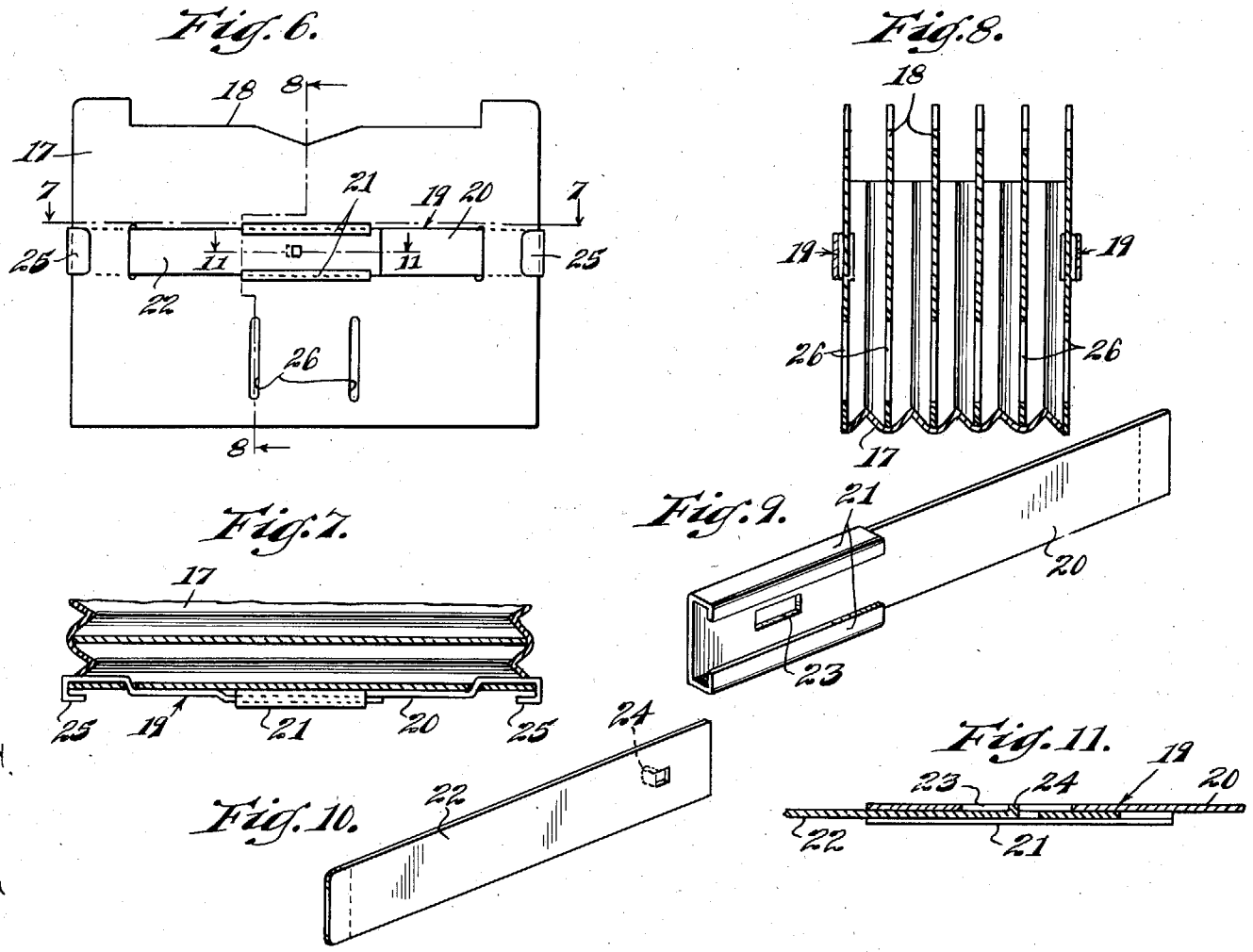
Witnesses:
E. E. Wessels
Anita E. Matson
Inventor:
William J. White,
By Joshua R. H. Pope
his Attorney.

Reissued Aug. 25, 1936

Re. 20,081

UNITED STATES PATENT OFFICE 20,081

FILE

William J. White, Chicago, Ill.

Original No. 1,906,892, dated May 2, 1933, Serial No. 641,410, November 5, 1932. Application for reissue May 31, 1934, Serial No. 728,430

27 Claims. (Cl. 129—15)

The present invention relates to new and useful improvements in files, and is intended for use particularly by large business establishments, such as light and power companies, gas companies, banks, clearing houses, etc., but it is to be understood, of course, that a file in accordance with the present invention may be used for any purpose and in any manner for which same may be found adapted.

The primary object of the present invention is to provide, in a manner as hereinafter set forth, a file of the aforementioned character embodying a novel construction, combination and arrangement of parts through the medium of which bill stubs may be rapidly and accurately sorted.

Other objects of the invention are to provide a file of the character described which will be simple in construction, strong, durable, light in weight, compact, portable, and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Fig. 3 is a view in front elevation of the file;

Fig. 4 is a detail view in front elevation of one of the removable, multiple pocketed collapsible containers;

Fig. 5 is a detail view in vertical longitudinal section, taken substantially on the line 5—5 of Fig. 4;

Fig. 6 is a detail view in front elevation of the other or rear removable container;

Fig. 7 is a view in horizontal section through one end portion of the rear removable container, taken substantially on the line 7—7 of Fig. 6, and looking downwardly, as indicated by the arrows;

Fig. 8 is a detail view in vertical longitudinal section, taken substantially on the line 8—8 of Fig. 6;

Fig. 9 is a detail view in perspective of one of the clamp members;

Fig. 10 is a detail view in perspective of the other clamp member; and

Fig. 11 is a fragmentary view in horizontal section through one of the container clamps, taken substantially on the line 11—11 of Fig. 6.

Figures 1, 2:
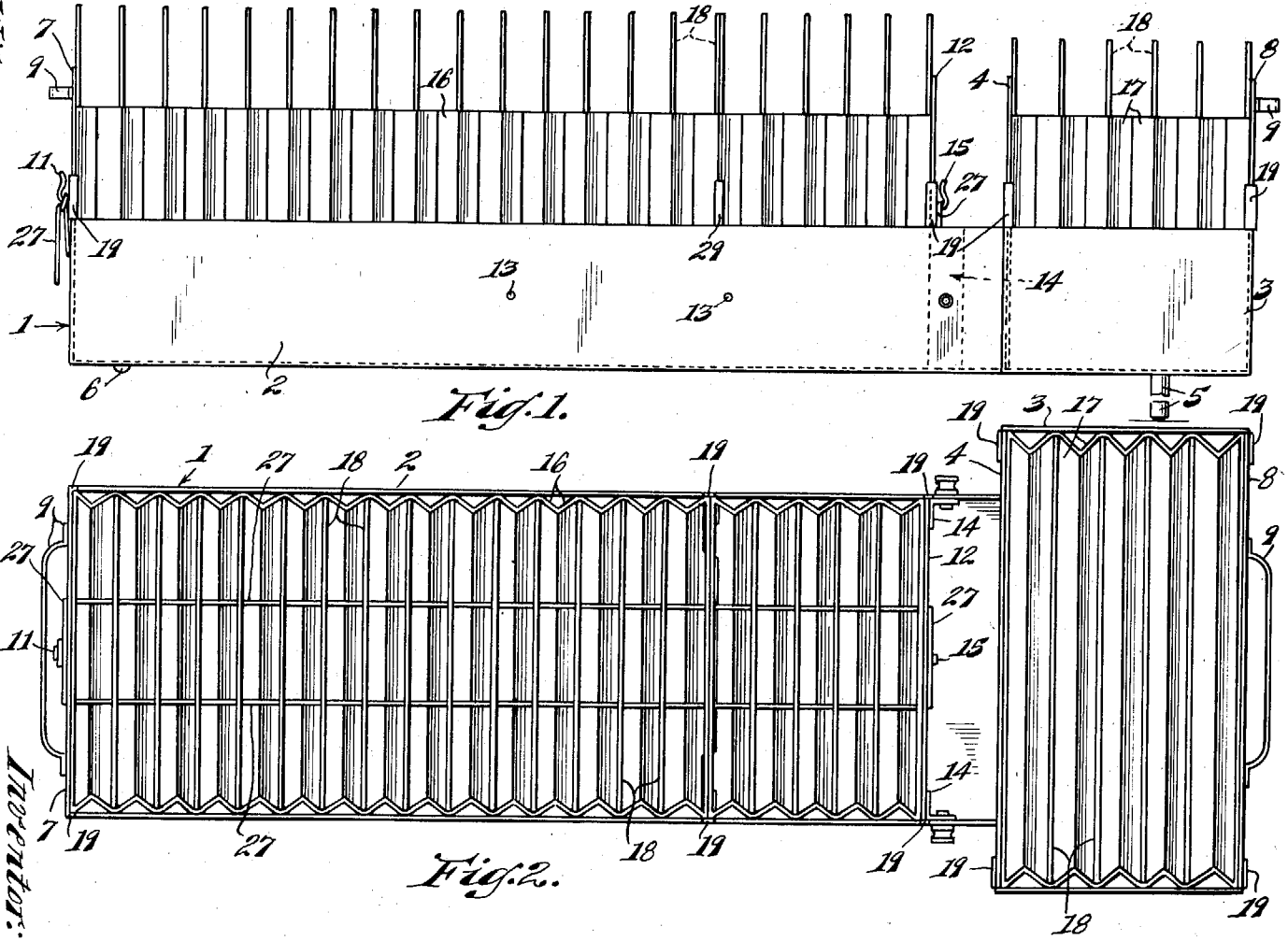
Fig. 1 is a view in side elevation of a file constructed in accordance with the present invention.
Fig. 2 is a top plan view thereof.

Referring now to the drawings in detail, it will be seen that the embodiment of the invention which has been illustrated comprises an elongated, rather shallow container constituting a holder which is designated generally by the reference number 1, said holder being formed of any suitable material, preferably metal. The holder 1 is substantially T-shaped in plan and includes a comparatively long portion 2 on the rear end of which is a comparatively wide but short portion 3. A permanent partition 4 is provided where the portions 2 and 3 of the holder 1 merge, thus dividing said holder into a pair of compartments.

The holder 1 further includes a pair of legs 5 which elevate the rear of said holder. The forward end portion of the holder 1 rests on a pair of pads 6. It will thus be seen that the holder will be positioned at a convenient angle or inclination. The front and rear walls 7 and 8, respectively, of the holder 1 rise above the side walls of said holder and have fixed on their upper portions handles 9.

In its lower portion, the front wall 7 of the holder 1 has formed therein an opening 10 above which is mounted a hook 11. The reference numeral 12 designates an adjustable partition which is mounted in the portion 2 of the holder 1. The side walls of the portion 2 of the holder 1 are provided with openings 13 (see Fig. 1) to permit adjustment of the partition 12. The openings 13 are for the reception of the nut-equipped bolts which are mounted in angle pieces 14 on the ends of the partition 12. The partition 12, in its lower portion, is provided with an opening similar to, and alined with, the opening 10 and above which a hook 15 is provided.

The partitions 12 and 4 rise above the side walls of the holder 1. The portions 2 and 3 of the holder 1 are for the reception of multi-pocketed collapsible, removable containers 16 and 17. The sides and bottoms of the containers 16 and 17 are of bellows form. The ends and partitions of the removable containers 16 and 17 rise above the sides thereof and are cut out, as at 18, to expose the upper portions of the contents of the pockets and to facilitate the removal of said contents.

Clamps, which are designated generally by the reference numeral 19, are provided for removably securing the containers 16 and 17 in the holder 1. Each clamp 19 includes a section 20 having opposed flanges 21 on one end portion providing channels in which a section 22 is slidably mounted. Between the flanges 21, the section 20 has formed therein a longitudinal slot 23 in which a lug 24 struck from the inner end portion of the section 22 is operable for permitting limited relative sliding movement between the sections 20 and 22. The outer end portions of the sections 20 and 22 are formed to provide offset jaws 25 which are inserted through the end portions of the containers 16 and 17 in the manner illustrated to advantage in Fig. 7 of the drawings. The end walls 7 and 8 and the partitions 4 and 12 of the holder 1 are provided, immediately above the side walls of said holder, with notches or recesses which accommodate the jaws 25 of the clamps 19. The sections 20 and 22 of the clamps 19 are frictionally secured in adjusted position relative to each other.

The end walls and partitions of the removable containers 16 and 17 have formed in their lower portions pairs of vertical, alined slots 26. A flexible loop in the form of an endless strand 27 extends through the slots 26 in the container 16 and has one end engaged over the hook 15 on the adjustable partition 12. The other end portion of the loop 27 is adapted to be secured on the hook 11 on the front wall 7 of the holder 1, as suggested in Fig. 3 of the drawings. The loop 27 is of sufficient length to permit same to be slacked to rest on the lower ends of the slots 26 normally. When drawn taut, the loop 27 moves upwardly in the slots 26 of the container 16 for elevating the contents of the pockets of said container. The elevating strand 27 may be secured in this operative position by wrapping same around the hook 11. An endless strand, similar to the strand 27, may be inserted in the slots 26 of the removable container 17 and may be used to elevate the contents of the pockets of the container and also to bind the container in collapsed condition as by knotting. The forward end wall of the container 16 has mounted thereon a holder 28 for a suitable removable indicia bearing card. The container 16 may, as illustrated, comprise a plurality of sections secured together by a clamp substantially similar to the clamps 19, as at 29. The strand 27 being an endless strand or loop may be pulled in the collapsible container so as to pull the back toward the front and collapse the same. When the container is collapsed the strand or loop 27 may be knotted to retain the collapsible container in collapsed condition.

It is believed that the many advantages of a file constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

Having thus described my invention, what I claim as new is:

1. A file comprising, in combination, a holder, certain of the walls of the holder rising above the other walls thereof, a multi-pocketed collapsible container removably mounted in the holder, and means on the container engageable with said certain walls for removably securing the container in the holder.

2. A file comprising, in combination, a holder comprising side and end walls, a partition adjustably mounted in the holder, said partition and the end walls rising above the side walls, a multipocketed, collapsible container removably mounted in the holder, and means on the ends of the container engageable with the partition and one of the end walls for removably securing the container in the holder.

3. A file comprising a holder of substantially T-shape plan, a partition in the holder, said partition providing a plurality of compartments in the holder, multipocketed collapsible containers removably mounted in the compartments, and means on the containers for removably securing said containers in the compartments.

4. A file comprising a holder, a partition in the holder, said partition and an opposed wall of the holder having alined openings therein, hooks mounted above the openings, a multipocketed, collapsible container removably mounted in the holder, said container having alined vertical slots therein, and flexible means operable in the slots for elevating the contents of the pockets of the container, said means being engaged with one of the hooks, and engageable with the other hook for securing said means in operative position.

5. A file comprising a plurality of collapsible containers, and extensible means for releasably securing said containers to each other.

6. A file comprising a plurality of collapsible containers, and extensible means for releasably securing the ends of said containers together.

7. In filing means, a container provided with recesses adjacent the ends thereof, interengaging sectional extensible clamping means adapted to be inserted in said recesses and supported by said container for securing said container to an object.

8. A file comprising in combination a holder comprising side walls and an end wall, a partition forming an end wall of said holder located between said side walls and adjustably mounted for movement between said side walls, a container, and means for removably and adjustably securing the container in the holder to the partition.

9. A file having in combination a holder having side walls and a transverse wall, a collapsible container carried by said holder, a partition located between said side walls and adjustably mounted for movement between said side walls to control the degree of collapse or expansion of the container, and means for removably and adjustably securing the container to the partition.

10. A file comprising a collapsible container of the accordion type in which material is adapted to be filed, said container being provided with a slot, and a member extending through said slot and adapted to be moved in said slot to raise at one time all said material relative to said container to permit said matter to be easily removed.

11. A file comprising a collapsible container of the accordion type in which material is adapted to be filed, said container being provided with a plurality of vertical slots, and a member extending through said slots and adapted to be moved in said slots to raise at one time all said material relative to said container to permit said matter to be easily removed.

12. A file comprising a holder, a container in said holder in which material is adapted to be filed, said holder and said container being provided with slots, and a member extending through said slots and adapted to be moved in said slots to raise said material relative to said container.

13. A file comprising a holder, a container in said holder in which material is adapted to be filed, said holder and said container being provided with slots, a member extending through said slots and adapted to be moved in said slots to raise said material relative to said container, and means for maintaining said material in raised condition.

14. A file comprising a collapsible container of the accordion type in which material is adapted to be filed, said container being provided with a plurality of vertical slots, a member extending through said slots and adapted to be moved in said slots to raise at one time all said material relative to said container to permit said matter to be easily removed, and means for maintaining said material in raised condition.

15. A file comprising a holder, a container, and extensible clamp means for removably affixing the container at one end to the holder.

16. A file comprising a holder, a container, and interengaging sectional clamp means for removably affixing an end of the container to the holder.

17. A file comprising a holder having side walls and an end wall, and a vertical partition movable in its vertical condition in the holder extending substantially above one or more of said side walls, and a container located in said holder and adapted to be removably secured to said partition.

18. A file comprising a holder having side walls and an end wall, a movable vertical partition movable in its vertical condition extending substantially above one or more of said side walls, and a container located in said holder and adapted to be removably secured to said partition.

19. A file comprising in combination a holder provided with edge cut-out portions, a container provided with edge slots, and means for removably securing the holder to the container, cooperable with said cut-out portions and slots.

20. In filing means a drawer having an end wall, a container adapted to be retained in said drawer, and extensible means for removably attaching one end of the container to the end wall of the drawer.

21. In filing means a collapsible container in which material is adapted to be filed, said container being provided with a slot, and a member extending through said slot and adapted to be moved in said slot to raise at one time all said material relative to said container to permit said matter to be easily removed and to collapse said container.

22. In filing means a collapsible container in which material is adapted to be filed, said container being provided with a slot, and a member extending through said slot and adapted to be moved in said slot to raise at one time all said material relative to said container to permit said matter to be easily removed, to collapse said container, and to retain said container in collapsed condition.

23. A file comprising in combination a holder including side walls and an end wall, a vertical partition located between said side walls and adjustably mounted for movement between said side walls in its vertical condition for collapse and expansion of a container, a collapsible container, and means for removably and adjustably securing the container to the holder at one end of the container and to the partition at the other end.

24. A file having in combination a holder having side walls and a transverse wall, a collapsible container, a vertical partition located between said side walls and adjustably mounted for movement between said side walls in its vertical condition for collapsing and expanding the container, and means for removably securing the container in the holder and to said partition.

25. A file comprising in combination a holder including side walls and an end wall, a vertical partition extending substantially above one or more of said side walls and located between said side walls and adjustably mounted for movement between said side walls in its vertical condition for collapse and expansion of a container, a collapsible container, and means for removably and adjustably securing the container to the holder at one end of the container and to the partition at the other end.

26. A file comprising a container of the accordion type in which material is adapted to be filed, said container having cut-out partitions providing pockets and said container being provided with a slot and a member extending through said slot and adapted to be moved in said slot to raise said material and expose the upper portion of the material in the cut-out portion of the partitions and facilitate the removal of said material.

27. A file comprising a container of the accordion type in which material is adapted to be filed, said container being provided with a slot and a member extending through said slot and adapted to be moved in said slot to raise said material relative to said container to permit all said matter to be easily removed.

WILLIAM J. WHITE.